United States Patent [19]

Masak

[11] 4,177,464
[45] Dec. 4, 1979

[54] MULTIPLEXING OF MULTIPLE LOOP SIDELOBE CANCELLERS

[75] Inventor: Raymond J. Masak, East Northport, N.Y.

[73] Assignee: The United States of America as represented by the Secretary of the Air Force, Washington, D.C.

[21] Appl. No.: 960,207

[22] Filed: Nov. 13, 1978

[51] Int. Cl.² .................................................. G01S 3/06
[52] U.S. Cl. ............................................. 343/100 LE
[58] Field of Search ................................... 343/100 LE

[56] References Cited

U.S. PATENT DOCUMENTS

| | | | |
|---|---|---|---|
| 3,202,990 | 8/1965 | Howells | 343/100 LE |
| 3,881,177 | 4/1975 | Len et al. | 343/100 LE X |
| 3,982,245 | 9/1976 | Soule, Jr. et al. | 343/100 LE |
| 4,044,359 | 8/1977 | Applebaum et al. | 343/100 LE |

Primary Examiner—Maynard R. Wilbur
Assistant Examiner—Richard E. Berger
Attorney, Agent, or Firm—Joseph E. Rusz; Casimer K. Salys

[57] ABSTRACT

A sidelobe canceller in which the undesired signals in the main antenna channel are cancelled at RF using signals from multiple auxiliary antennas, where each auxiliary antenna signal has been weighted in a vector modulator while at RF. The weighting is determined in a single wideband IF loop by multiplexing the multiple auxiliary antenna signals through the same auxiliary receiver, correlator and demodulator. The demodulated output signal from each auxiliary antenna is sampled and retained as a weighting to adjust the vector modulator for the corresponding auxiliary antenna. A timing and control circuit coordinates the multiplexing and sampling functions.

3 Claims, 1 Drawing Figure

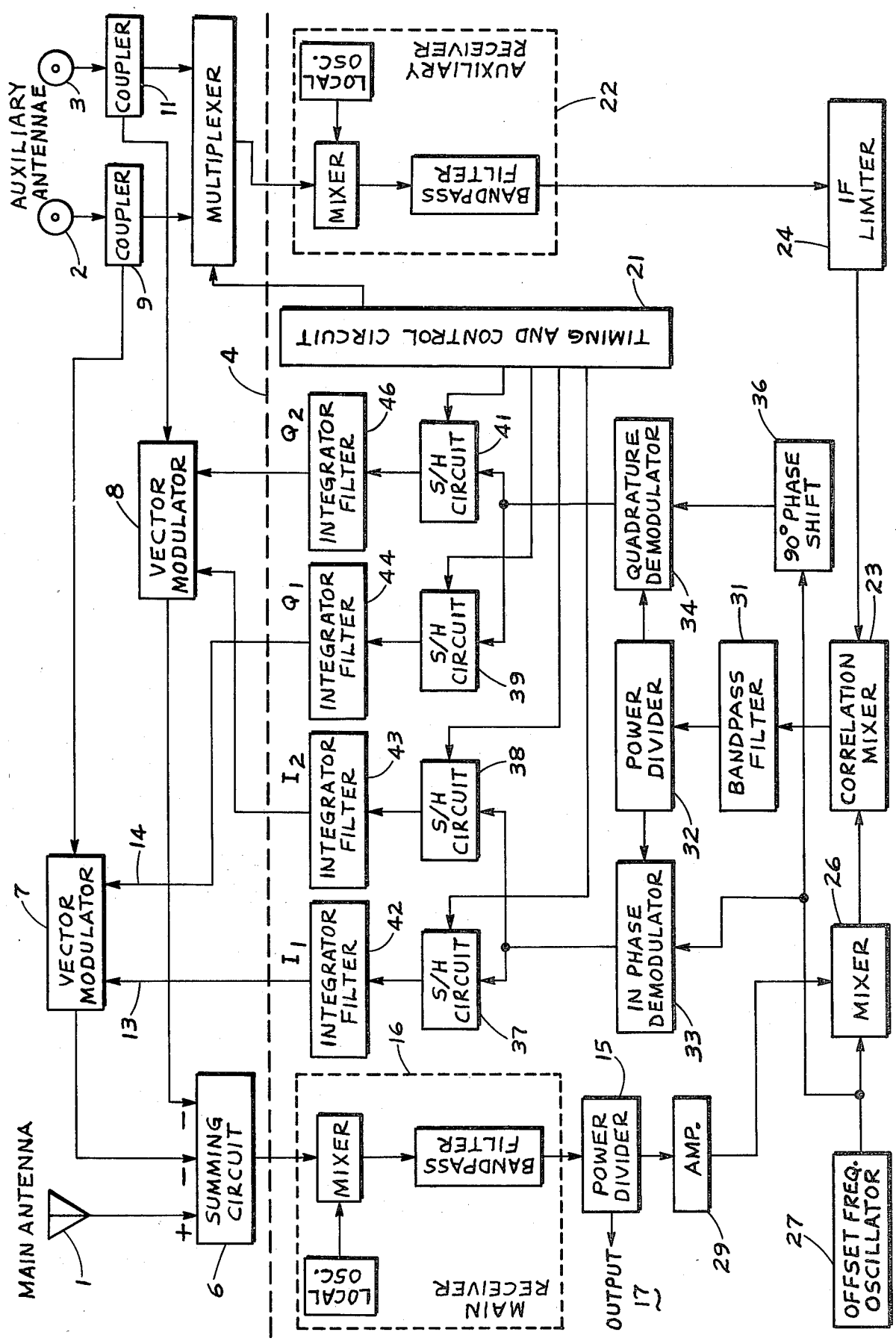

MULTIPLEXING OF MULTIPLE LOOP SIDELOBE CANCELLERS

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention is in the field of signal processors for radar signal receiving systems, and more particularly relates to a sidelobe cancellation circuit used to suppress the effects of undesired signals being received by the main channel antenna.

(2) Description of the Prior Art

Sidelobe cancellers are not new in the field of radar signal processing; nor is multiplexing a novel technique to overcome the need for multiple parallel circuits performing essentially the same signal processing function on analogous signals. Consider, as a first example, U.S. Pat. No. 3,202,990, which issued on Aug. 24, 1965 to Inventor Paul W. Howells. Though the Howells patent was one of the early works in the field of sidelobe cancellers, Howells recognized the need for and benefits accruing from a system utilizing more than one auxiliary antenna. The Howells approach, as shown in FIG. 2 of the above noted patent, is to provide each auxiliary antenna with a full complement of processing circuitry. As a further point for future reference, note that the cancellation of undesired signals in Howells occurs at intermediate frequency (IF).

A later variation to the Howells patent appears in U.S. Pat. No. 4,044,359, in which Howells is a joint inventor with Sidney P. Applebaum and James C. Kovarik. This patent further refines the concept of sidelobe cancellation with multiple auxiliary antennas, but again adopts the signal processing structure in which each auxiliary antenna retains an independent receiver and correlator. Note again that cancellation of the undesired signals in the main channel is performed at IF.

Sidelobe cancellation at IF was the subject of another invention which issued as U.S. Pat. No. 3,982,245 on Sept. 21, 1976. Inventors Hendrick H. Soule, Jr. and John F. Jureller address themselves to a sidelobe canceller configuration in which sample and hold functions or preprogrammed weights are interposed in the correlation signal path. As was the case in the prior art, Soule, Jr. et al modifies the IF operation without deleting the multiple channels of processing or transferring the cancellation function to the radio frequency (RF) stages of circuitry.

Joseph F. Len and Peter M. Rankin, in U.S. Pat. No. 3,881,177, appear to have been the first to recognize that sidelobe signal cancellation at RF is feasible. Len et al discloses that phase and amplitude modulation and signal subtraction at RF overcome limitations in earlier techniques which transposed all signals to IF prior to such processing. Nevertheless, the benefits associated with deleting the multiplicity of auxiliary antenna receivers and correlators was not recognized, as is shown by the repetative use of such functional blocks in FIG. 2 of Len et al.

SUMMARY OF THE INVENTION

The subject invention overcomes the various deficiencies in the foregoing inventions by a judicious combination of multiplexing and sampling. Cancellation of undesired sidelobe signals occurs at RF and the signals from the multiple auxiliary antennas are processed by a single receiver and correlator.

Three forms of signal processing are performed at RF, multiplexing of multiple auxiliary antenna signals, vector modulation of the antenna signals with the respective inphase and quadrature weights, and summation of the main antenna channel signals with the weighted auxiliary channel cancellation signals.

The auxiliary antenna signal transmitted through the multiplexer during any one period of time passes through the single auxiliary channel receiver and into the single correlator. After correlation with a signal from the main antenna channel the remaining signal is demodulated into its inphase and quadrature components. For each auxiliary antenna present one sample and hold circuit, having integration capability, is attached to the inphase demodulator and one to the quadrature demodulator. The demodulated signals are sampled by the respective auxiliary antenna sample and hold circuits at the end of each multiplexer transmission of that auxiliary antenna signal. The sampled inphase and quadrature signal is used as a weight in the vector modulation of the respective auxiliary antenna signals. The output of the vector modulators are summed with the main antenna signal to cancel the undesired signals received by the main antenna.

Vector modulation and undesired signal cancellation take place at RF, correlation and demodulation occur at wideband IF, while multiplexing, sampling and weighting effectively operate at baseband frequency.

With the increasing preference for array type radar systems and the trend toward broad use of adaptively controlled arrays, the benefits attributable to cancellation at RF and multiplexing through a single receiver and correlator are much more significant. These benefits become particularly important when the radar antenna to which cancellation is being applied consists of a multielement array or is sufficiently wideband to require up to three cancellation loop for each jamming or noise signal being cancelled.

BRIEF DESCRIPTION OF THE DRAWING

The drawing is a block diagram of a multiplexed multiple sidelobe canceller embodying two auxiliary antennas.

DESCRIPTION OF THE PREFERRED EMBODIMENT

The embodiment appearing in the drawing is a block diagram of a radar sidelobe canceller in which the two auxiliary antenna signals are multiplexed and sampled in the course of determining the cancellation signal weights. Auxiliary antenna signal weighting and cancellation is performed at RF, while almost all remaining signal processing takes place at wideband IF. The singular exception is the multiplexing and sampling rep rate which cycles at or near the radar interpulse rate.

Though the functional elements within each block of the drawing are conventional in their fundamental design, considerations such as bandwidth will be provided at a future point in the description. Since the location and effects of amplifiers is generally straight forward, no attempt will be made to depict them or describe their effects unless they constitute a controlling force in the operation of the sidelobe canceller shown in the drawing.

Main antenna 1, auxiliary antenna 2 and auxiliary antenna 3 receive the L band RF radar signals. Their relative physical locations are prescribed by design considerations beyond the scope of this invention. The two auxiliary antennas are from a class generally known as omni directional antennas, though they could with equal effectiveness represent directional antennas or elements of an antenna array.

Dashed line 4 defines a demarcation above which signals are at L band, the RF carrier frequency, while the functional blocks below operate primarily at various intermediate frequencies. Cancellation of the undesired signals takes place in summing circuit 6 by subtracting the signals directionally coupled from auxiliary antennas 2 and 3 after the raw antenna signals have been appropriately weighted in respective vector modulators 7 and 8. The same directional couplers, 9 and 11, connect the signal paths from auxiliary antennas 2 and 3 into multiplexer 12.

The L band vector modulators, designated 7 and 8, are composed of 90° hybrids, bipolar current controlled attenuators and summing junctions. These modulators adjust both the amplitude and phase of the raw auxiliary antenna signals through the appropriate bipolar weighting of the inphase and quadrature components of these antenna signals. As an example, vector modulator 7 alters the signal from auxiliary antenna 2 by a complex weight W, defined mathematically as $W = I + jQ$. Baseband inphase weight I enters by signal path 13 and baseband quadrature weight Q enters on signal path 14.

The main channel signal received through antenna 1 is summed in RF hybrid summing circuit 6 to cancel the undesired component of the main channel signal. The objective of this approach is fully described in prior art. Once cancellation has taken place, the main channel signal enters its conventional main receiver 16 to be converted into an IF signal of 52 MHz for subsequent processing. Since weighting is at baseband and vector modulation is continuous, output signal 17, a divided segment of the signal leaving receiver 16, remains continuous in time irrespective of the multiplexed treatment of the auxiliary antenna signals.

The multiplexed auxiliary antenna signals are processed in conventional auxiliary receiver 22 to produce a multiplexed IF output signal at a nominal center frequency of 52 MNz and a bandwidth of 6 MHz. This IF signal is coupled into correlation mixer 23 after passing through wideband IF limiter 24. The other input to correlation mixer 23 is a continuous feedback signal at 31 MHz, created in mixer 26 when a signal from 21 MHz offset frequency oscillator 27 is mixed with a portion of main channel signal leaving main receiver 16.

The main channel signal entering mixer 26 contains not only the desired signal received by antenna 1 but also contains that portion of the undesired signals which was not fully cancelled in summing circuit 6. Since amplifier 29 is effectively located in the error feedback loop it serves to control the cancellation loop gain.

Bandpass filter 31 selects the 21 MHz lower sideband of the signal leaving correlation mixer 23. The sideband signal is power divided in block 23 and applied in equal magnitudes to inphase demodulator 33 and quadrature demodulator 34. The signal entering each demodulator undergoes synchronous detection down to baseband using a reference tone of 21 MHz, readily available from offset frequency oscillator 27 at 0°, or 90° after being shifted in phase by block 36.

A pair of sample and hold circuits is connected to inphase demodulator 33, and another pair is connected to quadrature demodulator 34; two sample and hold circuits for each auxiliary antenna present. All four of the sample and hold circuits, blocks 37, 38, 39 and 41, are under the direct control of timing and control circuit 21 to coordinate the transmission of auxiliary antenna signals through multiplexer 12 with the corresponding sample and hold blocks. In one form, each sample and hold circuit is composed of a conventional FET switch.

The output of each sample and hold circuit is connected to an independent integrator filter. Integrator filters 42, 43, 44 and 46 effectively constitute the final stages of the correlation process necessary to derive the weights applied to L band vector modulators 7 and 8. In one form, each filter is formed by an RC integrator in conjunction with a voltage follower output. The output signals from the integrator filters are designated I for inphase and Q for quadrature, with subscripts to indicate whether they are associated with the first or second auxiliary antenna.

As was noted previously, vector modulation of the auxiliary signals and the subsequent cancellation of the undesired signals in the main antenna channel all occur at RF, i.e. L band. Furthermore, IF signal processing in the functional blocks is maintained at wideband through the demodulation stage of processing. The use of wideband components in the correlation stage eliminates the need for duplicate correlation mixers and filters for each auxiliary antenna path. Thereby, only those components constituting the sample and hold circuits and the integrator filters need appear four times, two for each auxiliary antenna. Wideband processing at IF does not alter the RF component count, in that the number of vector modulators is equal to the number of auxiliary antennas.

Though the control functions generated by timing and control block 21 can be sequenced to operate in a free running mode, in responsive to timing signals generated by an internal clock, or synchronized to a radar transmitter trigger pulse, reference to the trigger pulse from the radar transmitter is generally preferred. The operation of the timing and control circuit embodied in the drawing is referenced to the transmitter. Depending on the operator's preference, multiplexer 12 is actuated to transmit auxiliary antenna signals into auxiliary receiver 22 at a rate of either 1, 2 or 4 times per antenna for each interpulse period of the transmitter. Each interrogation time slot corresponds to a $28\mu$ second period of transmission through the multiplexer. Since auxiliary receiver 22 has a 6 MHz bandwidth, which corresponds to a settling time of approximately $0.17\mu$ seconds, the $28\mu$ seconds is more than sufficient for the receiver and ensuing stages to reach steady state.

Timing and control circuit 21 actuates the appropriate pair of sample and hold circuits for a period of $2\mu$ seconds at the end of each $28\mu$ second transmission time. Of course, the multiplexer and sample and hold circuits are coordinated such that sample and hold circuits 37 and 39 are actuated when multiplexer 12 transmits signals from corresponding auxiliary antenna 2. Transmissions from auxiliary antenna 3 are similarly coordinated with sample and hold circuits 38 and 41.

The foregoing multiplexing and sampling control sequence is suitable for a nominal interpulse period of 250μ seconds and may be capable of handling such periods extending to a duration of 2000μ seconds. As is generally known by those skilled in the art, a sampled-data feedback system of the type described improves in operation when more independent samples are obtained during a particular interpulse time period.

Those skilled in the art will also recognize that the structural embodiment appearing in the drawing is readily amendable to the inclusion of additional auxiliary antennas. Such antennas would commonly share the signal processing blocks beginning with multiplexer 12 and extending through demodulators 33 and 34. Since these elements operate at wideband IF, the structural modifications necessary to handle the additional antennas are relatively forthright.

I claim:

1. An improved sidelobe canceller in which cancellation of the undesired signals is performed at RF and the cancellation weights are determined from samples of correlated and demodulated signals, wherein the improvement comprises: a multiplexer communicating with each auxiliary antenna and capable of transmitting any one of the auxiliary antenna signals into a channel of signal processing upon command, and a timing and control circuit connected to said multiplexer and a set of sample and hold circuits in the signal processing channel, where said timing and control circuit coordinates the multiplexer transmission of each antenna signal with a timed sampling by said sample and hold circuits for the corresponding auxiliary antenna.

2. The improved sidelobe canceller recited in claim 1, wherein: said channel of signal processing comprises the functional elements of a receiver, a correlator and a demodulator, all of which operate at wideband IF.

3. The improved sidelobe canceller recited in claim 2, wherein: said timing and control circuit is synchronized to a radar transmitter reference pulse and said channel is sufficiently wideband to permit at least one complete interrogation of each auxiliary antenna between transmitter pulses.

* * * * *